United States Patent
Gaetano et al.

[19]

[11] Patent Number: 6,126,233
[45] Date of Patent: Oct. 3, 2000

[54] CHILD SAFETY SEAT WITH INTEGRATED ILLUMINATION

[76] Inventors: Steven Gaetano, 7585 Cedar Hurst Ct., Lake Worth, Fla. 33467; Marc Fleishman, 721 7$^{th}$ Way, West Palm Beach, Fla. 33407

[21] Appl. No.: 09/316,177

[22] Filed: May 21, 1999

[51] Int. Cl.$^7$ ...................................................... A47C 7/72
[52] U.S. Cl. ................................... 297/217.6; 297/250.1; 359/871
[58] Field of Search ............................. 297/217.6, 250.1, 297/188.06; 359/871

[56] References Cited

U.S. PATENT DOCUMENTS

| | | | |
|---|---|---|---|
| D. 376,662 | 12/1996 | Ambrosio | D26/28 |
| 1,137,091 | 4/1915 | Sclafani | 297/217.6 X |
| 1,659,572 | 2/1928 | Klemm | 297/217.6 X |
| 1,845,401 | 2/1932 | Dietrich | 297/217.6 X |
| 2,257,496 | 9/1941 | Gaugler et al. | 297/217.6 X |
| 2,833,502 | 5/1958 | Wildeboor | 297/217.6 X |
| 4,703,972 | 11/1987 | Omberg | 297/188.06 X |
| 4,712,892 | 12/1987 | Masucci | 359/871 |
| 4,902,118 | 2/1990 | Harris | 359/871 |
| 4,909,618 | 3/1990 | Gardner | 350/623 |
| 5,083,837 | 1/1992 | Raoch | 297/217.6 X |
| 5,285,321 | 2/1994 | Nolan-Brown | 359/871 X |
| 5,503,457 | 4/1996 | Rosado | 297/217.6 X |
| 5,668,526 | 9/1997 | Collins | 359/871 X |
| 5,848,820 | 12/1998 | Hecht et al. | 297/217.6 X |

Primary Examiner—Peter M. Cuomo
Assistant Examiner—Rodney B. White
Attorney, Agent, or Firm—John C. Smith

[57] ABSTRACT

A car seat for infants and small children that includes an integral illumination system that is remotely activated by the driver. The illumination system is an electro-luminescent lamp assembly which is mounted in the car seat such that when activated, it casts light on the child or infant so that the child or infant can be monitored. The illumination system is controlled by a portable remote control device that allows the driver to activate it remotely when the car seat is in the rear seat of the vehicle. Optionally, alternative lamp types such as LED devices, incandescent lamps, or neon lamps can be used in place of the electro-luminescent lamps. The lamps are integrated into the side panels of retaining bar of the car seat. Optionally, the electro-luminescent lamps can be cut such that they take the shape of entertaining characters. The lamp can be optionally embedded under a transparent cushion surface on the car seat or retaining bar. Also, a detachable lamp assembly can be used which is mounted to the car seat via hook and loop material such that it can be moved from one car seat to another.

18 Claims, 9 Drawing Sheets

CHILD SAFETY SEAT WITH INTEGRATED ILLUMINATION

BACKGROUND OF THE INVENTION

1. Technical Field

The present invention relates to child safety seats for use in vehicles. In particular, it relates to child safety seats that have integrated illumination devices that can be remotely controlled from the dashboard of the vehicle or by a portable mode control.

2. Background Art

The concern for the safety of small children and infants when traveling by automobile has resulted in the development of numerous safety devices. While certain devices, such as seat belts, are useful for people of all ages, they do not provide a complete solution for small children and infants. As a result, special devices have been developed to accommodate this group of users. Principal among these has been the development of customized child safety seats which are designed to protect and comfortably secure small children and infants while they are in a vehicle.

Initially, a parent would place a child's seat facing forward in the front seat of the automobile. This would allow the parent, when driving, to closely monitor the child by merely glancing over to look at the child in the adjacent seat. Even when driving at night, the proximity of the child in combination with the limited illumination coming from the dashboard of the vehicle allows the parent to adequately monitor and view the child without any additional illumination.

More recently, safety concerns over the placement of a child's car seat in the front of the vehicle, due to impact danger from the dashboard and/or danger of injury from activation of an automobile air bag, has resulted in the requirement that the child's seat be placed in the rear seat of the vehicle. Placing the seat in the rear of the vehicle has improved the level of safety provided to the child or infant. However, while improving overall safety, the remote placement of the child's or infant's seat in the rear of the vehicle has resulted in increasing the difficulty for the parent when attempting to monitor the child or infant.

One problem associated with the placement of the infant's or child's seat in the rear of the vehicle is that the parent must take his or her eyes off of the road to look back at the infant. While the parent could look in the mirror to see the child, it would be difficult to see the child in the dim light of the back seat. This is because the remote placement of the infant's or the child's seat in the rear of the vehicle makes it more difficult to use the illumination provided by the dashboard light which was effective when the child or infant was sitting in the front seat of the vehicle. It would be desirable to have a method of illuminating the infant or child so that the parent could monitor the child while driving, even when the child is sitting in the rear seat of the vehicle. Likewise, if adequate illumination were available, the parent could easily monitor the child with the vehicle's rear view mirror.

Of course, a typical vehicle will have overhead lights that can be turned on by the driver. However, use of the overhead lighting in a vehicle entails several disadvantages. First, the overhead lighting in a vehicle that would illuminate the rear seat would also be bright enough to interfere with the driver's view of the road. Second, the brightness of the overhead light in the rear of the vehicle would potentially wake up a sleeping child or infant. It would be desirable to have the ability to turn on a low-level or soft light that was sufficient to illuminate the child or infant for monitoring, but not bright enough to interfere with the driver's view of the road.

While addressing the basic desirability of using car seats for small children and infants, the prior art has failed to provide a car seat which provides sufficient illumination to view a child in a car seat mounted in the rear seat of a vehicle, and which does not interfere with the driver's view.

SUMMARY OF THE INVENTION

The present invention solves the foregoing problems by providing a car seat for infants and small children that includes an integral illumination system that can be remotely activated by the driver. The illumination system is an electro-luminescent lamp assembly which is mounted in the car seat such that when activated, it casts light on the child or infant so that the child or infant can be monitored. The illumination system is controlled by a portable remote control device that allows the driver to activate it remotely when the car seat is in the rear seat of the vehicle. Optionally, alternative lamp types such as LED devices, incandescent lamps, or neon lamps can be used in place of the electro-luminescent lamps. The lamps can be integrated into the side panels, the retaining bar, or the seat bottom of the car seat. Optionally, the electro-luminescent lamps can be cut such that they take the shape of entertaining characters. Another optional embodiment embeds the lamp under a transparent cushion surface on the car seat or retaining bar. Another embodiment uses a detachable lamp assembly that is mounted on the car seat via hook and loop material such that it can be moved from one car seat to another.

DESCRIPTION OF THE PREFERRED EMBODIMENT

Figure 1:
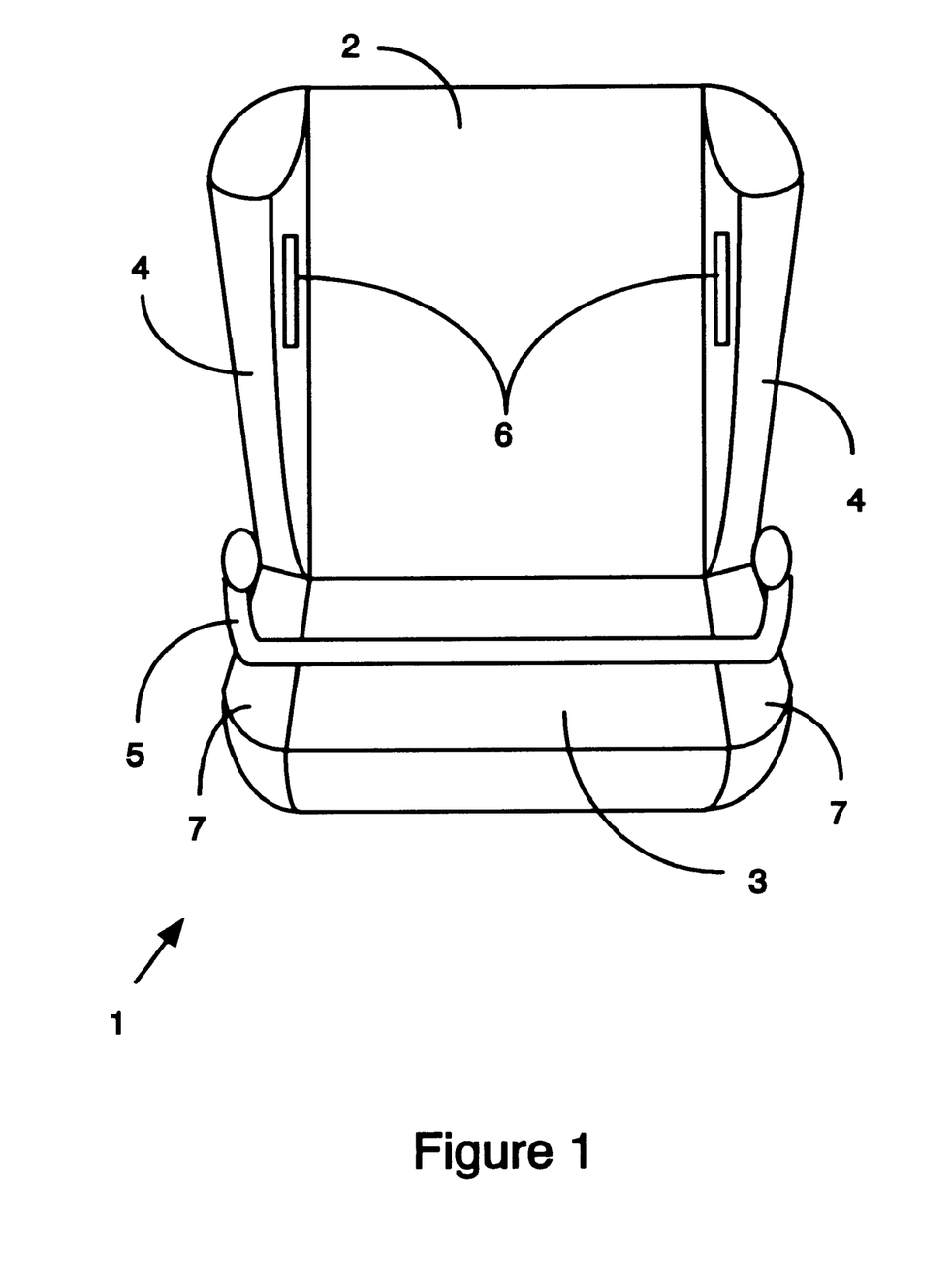
FIG. 1 is a top front perspective view of the car seat showing the illumination device mounted in the inside surface of the side panels of the car seat.

Referring to FIG. 1, this figure is a top front perspective view that shows a preferred embodiment of the invention. In this embodiment, a car seat 1 suitable for use by a small child or infant is shown. The major components of the car seat 1 are the seat back 2, the side panels 4 of the seat back 2, the seat bottom 3, the seat bottom support panels 7, and the child retaining bar 5. In addition to the foregoing items, which are typically found on any child's or infant's car seat, are the lamps 6 used by the illumination system provided by this invention.

In this embodiment, dual lamps 6 are used with one lamp 6 placed on each side panel 4 of the seat back 2. Those skilled in the art will recognize that the number of lamps 6 can vary so long as adequate illumination is provided. The number of lamps 6 can be limited to a single lamp 6, or several lamps 6 may be used for aesthetic reasons. In addition, as discussed more fully below in regard to FIG. 8, the lamps 6 may also be used to create designs or images.

The lamps 6 can be fabricated using any suitable technology. For example, the lamps 6 can be incandescent devices, LED's (light emitting diodes), neon lights, or electro-luminescent devices (EL lamps). In this preferred embodiment, EL lamps are used to fabricate lamps 6. EL lamps provide several advantages over alternative lamp technologies. They use very low power, they provide a soft comfortable light that is unlikely to wake a sleeping child or infant, they are flexible and very convenient to install on irregular surfaces such as those that may be found in a car seat 1, they come in a variety of colors, and they can even be cut into predetermined shapes for entertainment purposes (such as the silhouettes of animal figures, space ships, etc.). For ease of discussion, an EL lamp is used to describe the invention, but it is understood that alternative lamp technologies can be substituted.

Those skilled in the art will recognize that EL lamps are well known in the art and are commercially available from a variety of sources. For example, suitable EL lamps and matching DC inverters can be obtained from several manufacturers such as BKL, Inc. a corporation in King of Prussia, Pa., USA.

EL lamps typically produce a specific color when illuminated by an AC signal. For portable usage, such as with a car seat, a battery makes a suitable power source for the DC inverter. Commercially available DC to AC inverters typically have an input voltage of 1.5 to 28 volts DC. Typical output ranges of DC inverters are 25 to 180 volts AC, and output frequencies range from 100 Hz to 5000 Hz.

The output of an EL lamp is matched to a specific DC inverter to achieve maximum desired effect and maximum efficiency. Typically, DC inverters are selected based on the size of the EL lamp, brightness desired, and lamp-life considerations. The higher the output voltage and/or frequency of the DC inverter, the brighter the lamp.

EL lamps and DC inverters are well known in the art. As a practical matter, the selection of the DC inverter, the type of battery, and the particular EL lamp chosen will be based on design considerations such as the amount of surface area available to mount the EL lamp on, and the color and amount of brightness desired. Selection will also depend on the intended use, such as outdoors, where luminance may be more important for safety reasons, and indoor use where the color selected may have greater importance. Therefore, the selection of a particular size DC inverter and EL lamp surface area will typically be a design choice. In the case of use in conjunction with a child's or infant's car seat, the usage would invariably be at night. As a result, the brightness would not be as significant a factor as would be the choice of color, shape, etc.

EL lamps provide another significant advantage over other technologies. They are very thin flat devices which lend themselves to surface mounting in a variety of locations that would not be suitable for other lamp technologies. Further, by creating a slight indentation in the surface of an object, an EL lamp can actually be flush mounted and sealed such that it does not protrude from the surface of the object at all.

The following table illustrates a typical manufacturer's EL lamp performance based on applied voltage and frequency and their effect on luminance:

| Type | Color | Volt. (VAC) | Freq. (Hz) | Lum, (Ft-L) | Lum. (Cd/M2 |
|---|---|---|---|---|---|
| Low Power Long Life | White | 40 | 2000 | 5.3 | 18.2 |
| Low Power Long Life | White | 90 | 650 | 25.0 | 85.7 |
| Low Power Long Life | White | 120 | 400 | 31.0 | 106.2 |
| Low Power Long Life | Aviation Green | 40 | 2000 | 8.5 | 29.1 |
| Low Power Long Life | Aviation Green | 90 | 650 | 32.0 | 109.6 |
| Low Power Long Life | Aviation Green | 120 | 60 | 8.0 | 27.4 |
| Low Power Long Life | Aviation Green | 120 | 400 | 36.0 | 123.3 |
| Low Power Long Life | Blue Green | 120 | 400 | 29.0 | 99.4 |
| Low Power Long Life | Yellow Green | 120 | 400 | 36.0 | 123.3 |
| High Power Short Life | White | 120 | 400 | 26.0 | 89.1 |
| High Power Short Life | Aviation Green | 40 | 2000 | 4.5 | 15.4 |
| High Power Short Life | Aviation Green | 120 | 400 | 28.0 | 95.9 |
| High Power Short Life | Blue Green | 120 | 400 | 28.0 | 95.9 |
| High Power Short Life | Green | 40 | 2000 | 6.0 | 20.6 |
| High Power Short Life | Green | 120 | 400 | 28.0 | 95.9 |

Figure 2:
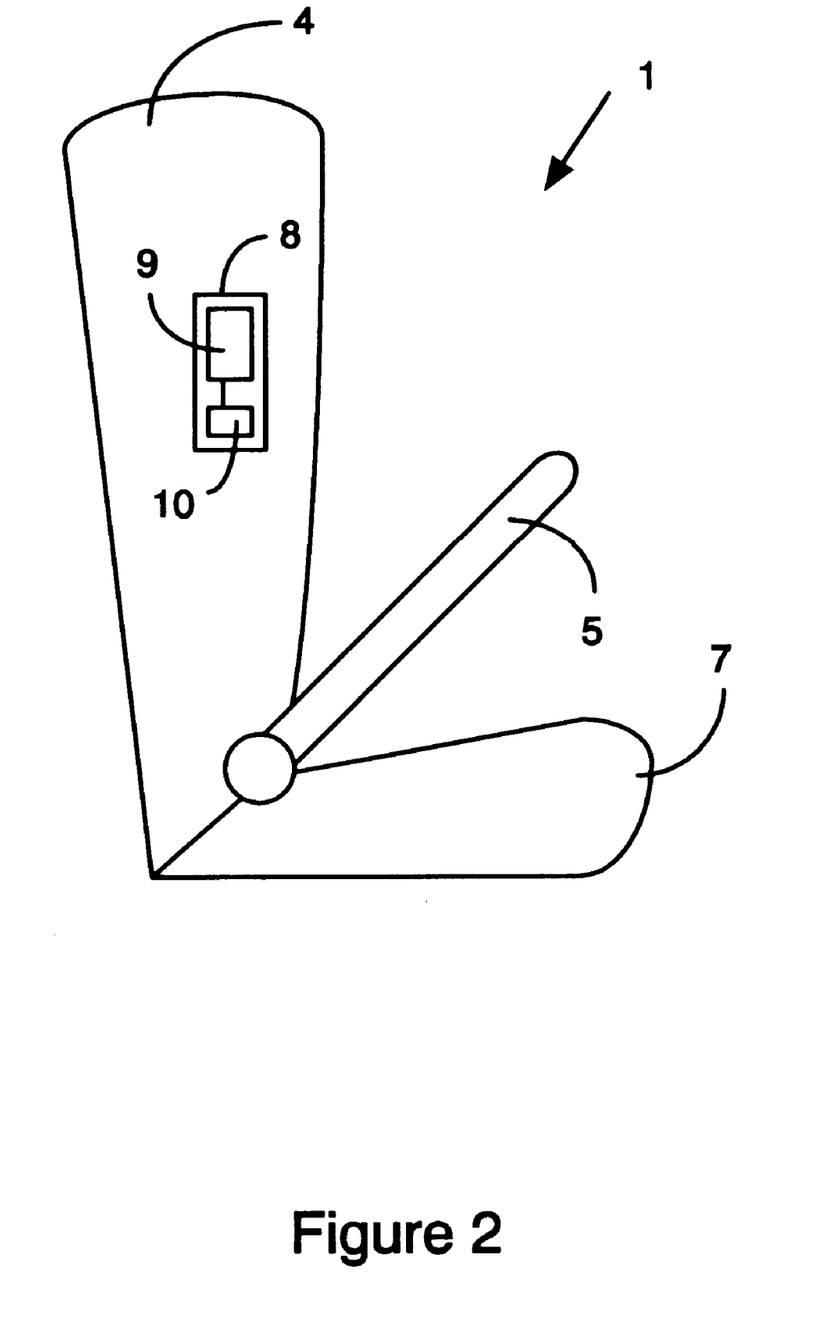
FIG. 2 is a side view of the car seat illustrating the control panel with electronic circuitry and power supply mounted on the outside surface of the side panel of the car seat.

In FIG. 2, a side view of the car seat 1 is illustrated. In this embodiment, the electronic controls 8 for the EL lamp 6 are shown mounted in the outer surface of the side panel 4 of the car seat 1. The electronic controls 8 include a power supply 10 (which would typically be a battery) that is electrically connected to the control circuitry 9. The control circuitry 9 is, in turn, electrically connected to the EL lamp 6. The control circuitry 9 includes a receiver (not shown) which receives control signals that activate or deactivate the EL lamp 6 under control of the driver, and circuitry to activate and control the EL lamp 6. This type of remote control on/off switch is well-known in the art and is commonly used on devices such as garage door openers.

When the driver of the vehicle wants to monitor the child or infant in the car seat 1, the driver would transmit a signal from a remote controller 11 or 13 (discussed more fully below in regard to FIGS. 6 and 7) which would be received by the receiver in the control circuitry 9. Upon receiving the signal, the control circuitry 9 would activate or deactivate the EL lamp 6. In addition, the control circuitry 9 and the remote controller 11 or 13 can also have additional controls to allow multiple light intensity's (i.e. dimming), flashing, or control of multiple EL lamps 6 for entertainment purposes.

Figure 3:
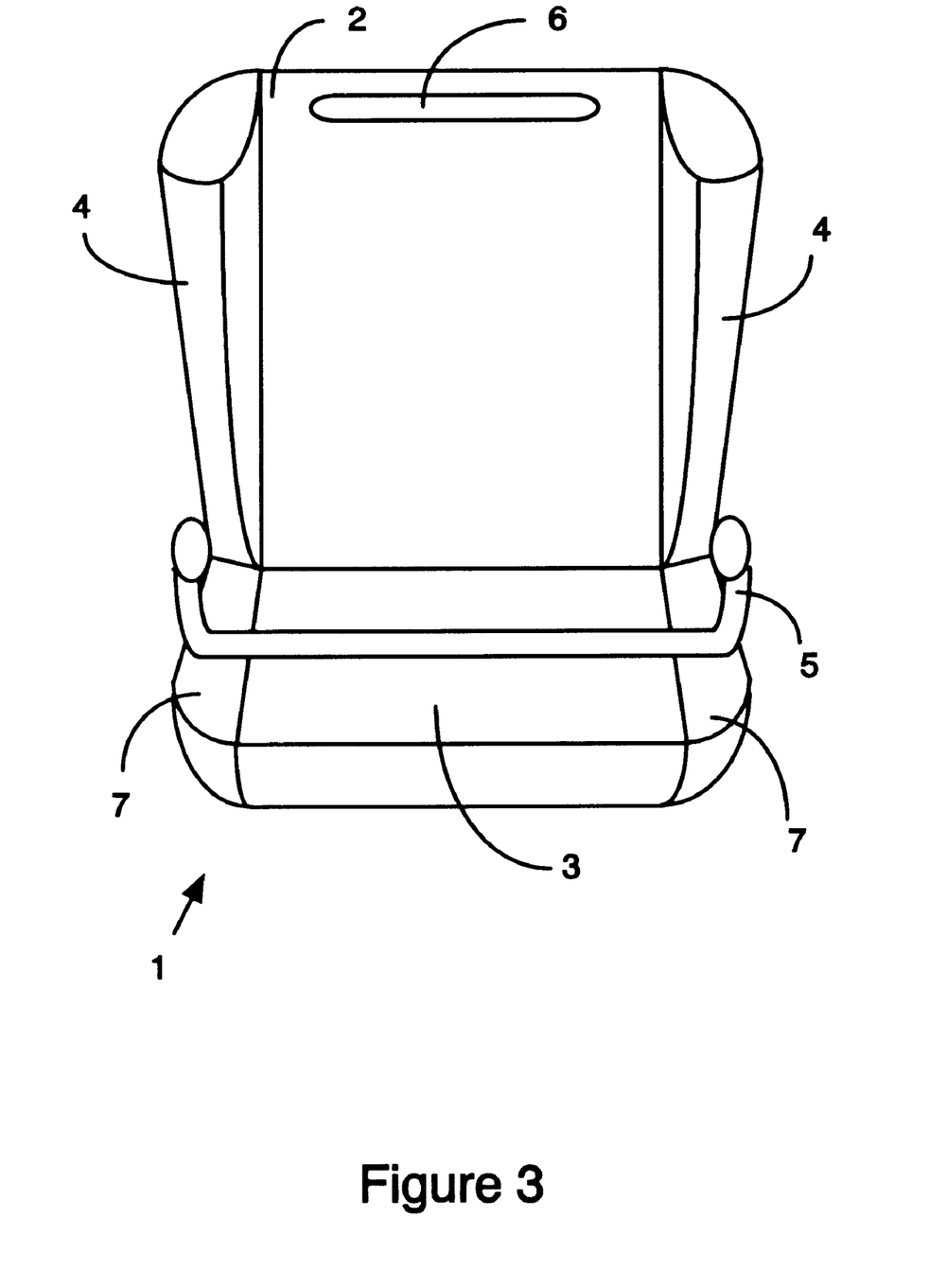
FIG. 3 is a top front perspective view of the car seat showing the illumination device mounted on the seat back of the car seat.

FIG. 3 shows an alternative preferred embodiment in which the EL lamps 6 from the previous embodiment are replaced with a single EL lamp 6 which is mounted in the seat back of the car seat 1. As can be seen from this figure, the actual placement of the EL lamp 6 can vary based on design goals. Also, for ease of illustration in the embodiments disclosed herein, the EL lamps 6 may be surface mounted. However, if the material used to fabricate the covers for the car seat 1 are transparent (for example, a major plastic, vinyl, etc.) then the EL lamp 6 can actually be mounted underneath the surface of the car seat 1. This provides several benefits. First, the EL lamp 6 is inaccessible to the child or infant. Second, interior placement of the EL lamp 6 allows for some interesting design alternatives which may be pleasing to the child or infant. Third, location of the EL lamp 6 under the surface of car seat 6 provides a measure of protection that is especially useful for lamps such as electro-luminescent lamps which are extremely long-lasting.

Figure 4:
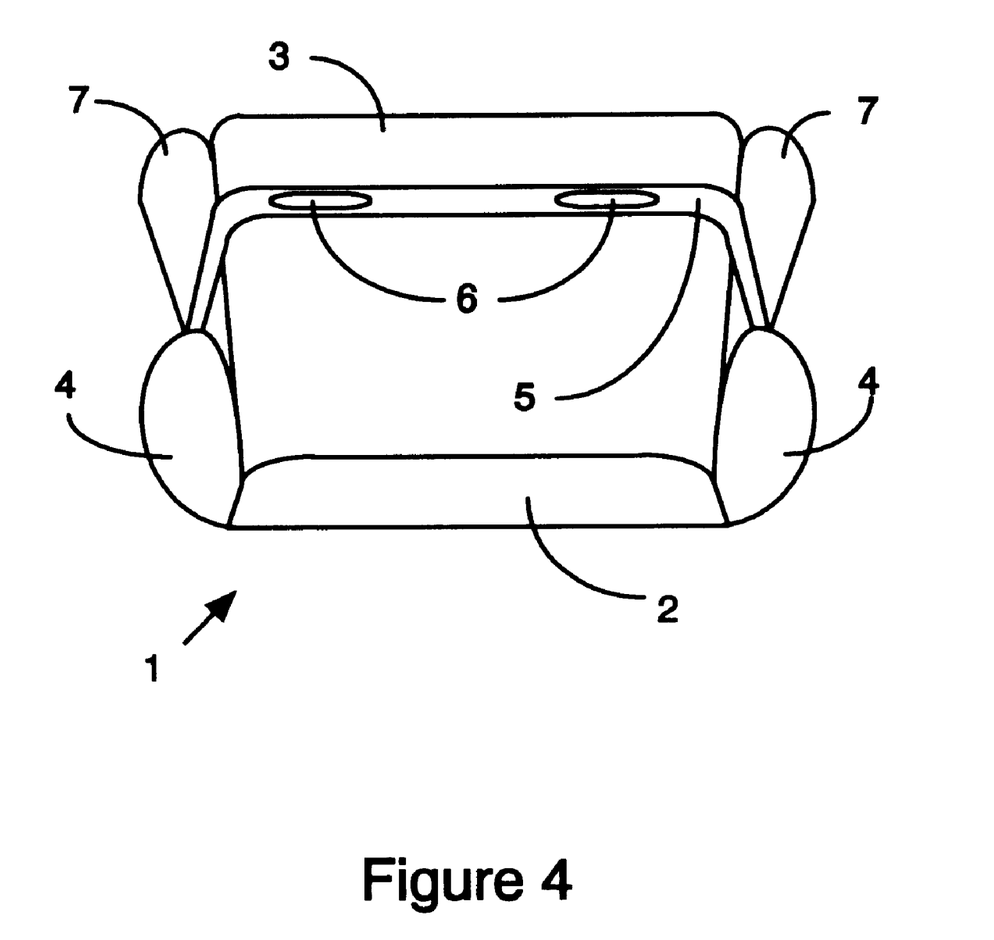
FIG. 4 is a top view of the car seat illustrating illumination devices mounted on the front bar of the car seat.

FIG. 4 is an alternative preferred embodiment that shows a top view of a car seat 1 in which multiple EL lamps 6 are embedded in the child restraining bar 5. Those skilled in the art will recognize that in addition to being able to locate the EL lamps 6 in any convenient location, the electronic controls 8 also be placed in any convenient location in the car seat 1.

Figure 5:
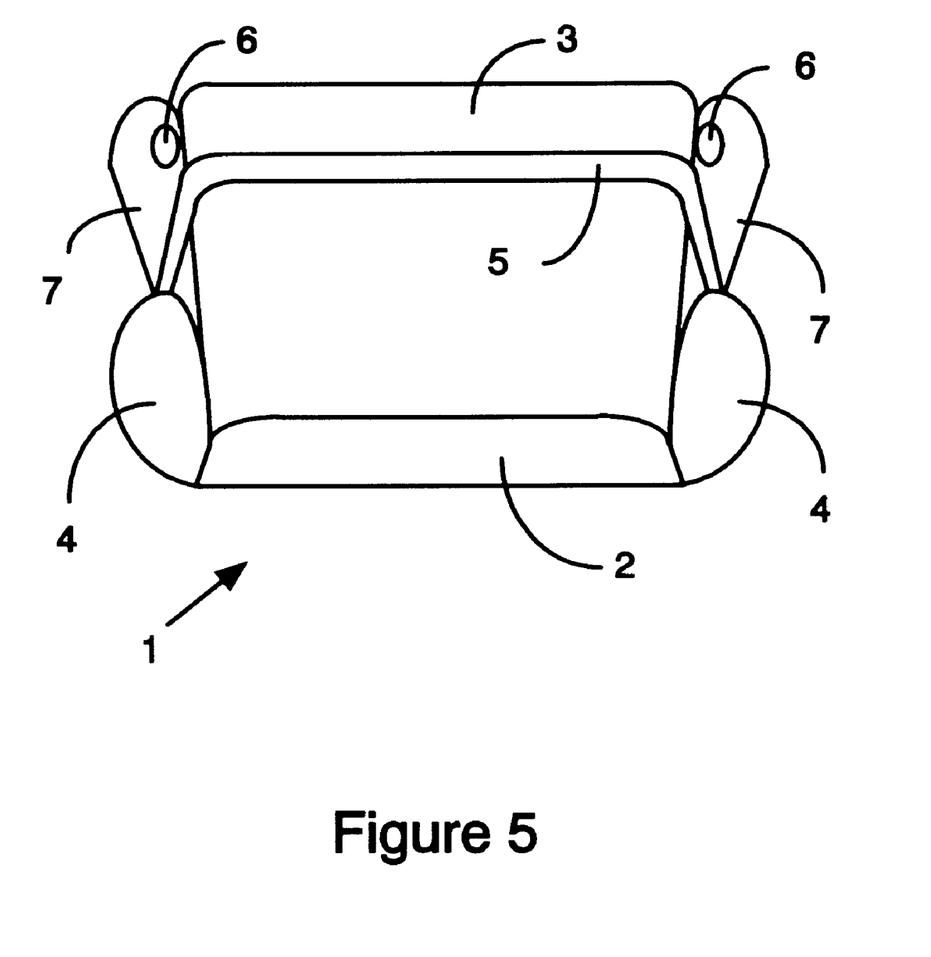
FIG. 5 is top view of the car seat illustrating illumination devices mounted on the seat side cushions of the car seat.

FIG. 5 is another alternative preferred embodiment that locates the EL lamps 6 in the seat bottom support panels 7. Of course, EL lamps 6 can be located in several places in a single car seat 1. For example, EL lamps 6 can be located in the seat bottom support panels 7, in the side panels 4, in the seat back 2, and in the child restraining bar 5 at the same time. Further, the electronic controls 8 can also include programming to selectively activate individual EL lamps 6 in a car seat 1 that has multiple EL lamps 6. In a multi-lamp system, the electronic controls 8 can also be programmed to alternately turn on and off selected EL lamps 63 in a pre-selected pattern that is designed to entertain the child or infant.

Figure 6:
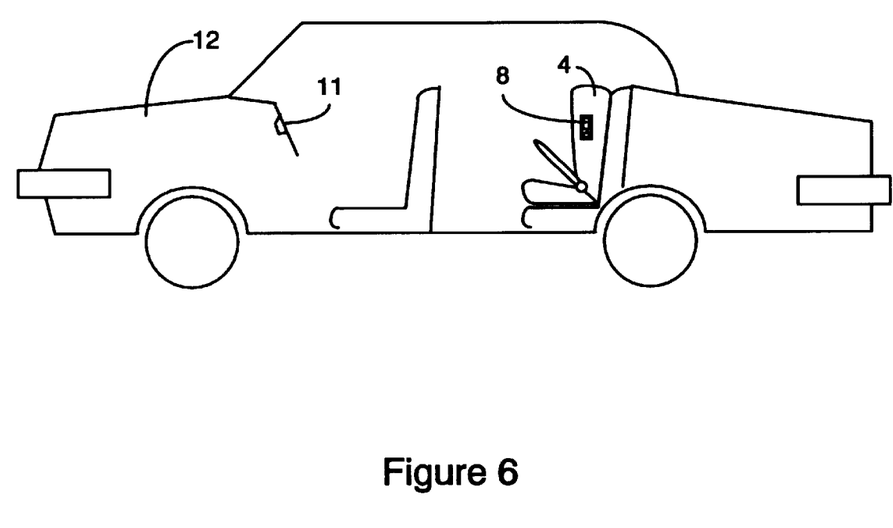
FIG. 6 is a side cut away view of a vehicle showing the car seat attached to the rear seat of the vehicle and a remote control unit mounted in the dashboard.

FIG. 6 illustrates a preferred embodiment in which a remote controller 11 is mounted in the dashboard of a vehicle 12. Permanent mounting in this manner is convenient in that the remote controller 11 is conveniently located for the driver. However, it also has the disadvantage of being more expensive to install and not being portable such that the illumination system of car seat 1 can be easily used in another vehicle.

Figure 7:
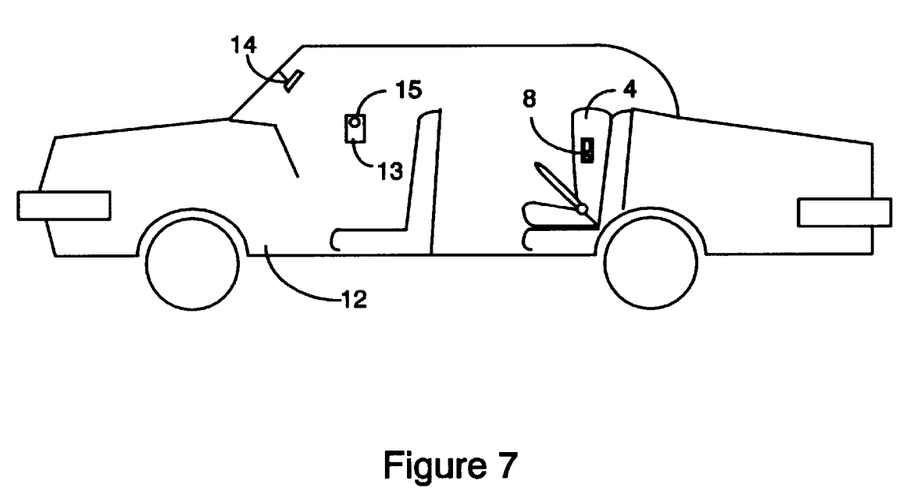
FIG. 7 is a side cut away view of a vehicle showing the car seat attached to the rear seat of the vehicle and a portable hand-held control unit available for the driver's use in the front seat.

FIG. 7 is another preferred embodiment in which the permanently mounted remote controller 11 is replaced with a portable remote controller 13. This embodiment is more convenient in that the car seat 1 can be moved between several cars without losing control of the illumination system. Also shown in this figure is rear view mirror 14. When the driver wishes to monitor the child or infant, the driver activates the remote controller 13 which transmits a signal to the electronic controls 8 that in turn activates the EL lamps 6 in the car seat 1. Once the EL lamps 6 are activated, the driver can glance at the child or infant through rear view mirror 14 without taking the driver's eyes off of the road.

Also shown in this figure is a dimmer control 15. While the most basic configuration of the portable remote controller 13 would have a simple on/off switch, a more convenient way of implementing the invention is to provide a dimmer control 15 which in this case is fabricated as a rotatable knob that travels from an off position to a fully illuminated position. The use of the dimmer control 15 allows the user to compensate for variations in light. As a result, only the minimum amount of light necessary to illuminate the child can be generated under control of the user. This reduces the chance that more light then necessary would be applied which in turn would result in the increased possibility of waking a sleeping child.

Those skilled in the art will also recognize that the integral illumination system of the car seat 1 can be implemented without remote controllers 11 or 13. However, this will entail the disadvantage of having a manual switch (not shown) on the car seat 1. This results in the driver having to reach into the back seat of the vehicle 12 in order to turn on the EL lamp 6.

Figure 8:
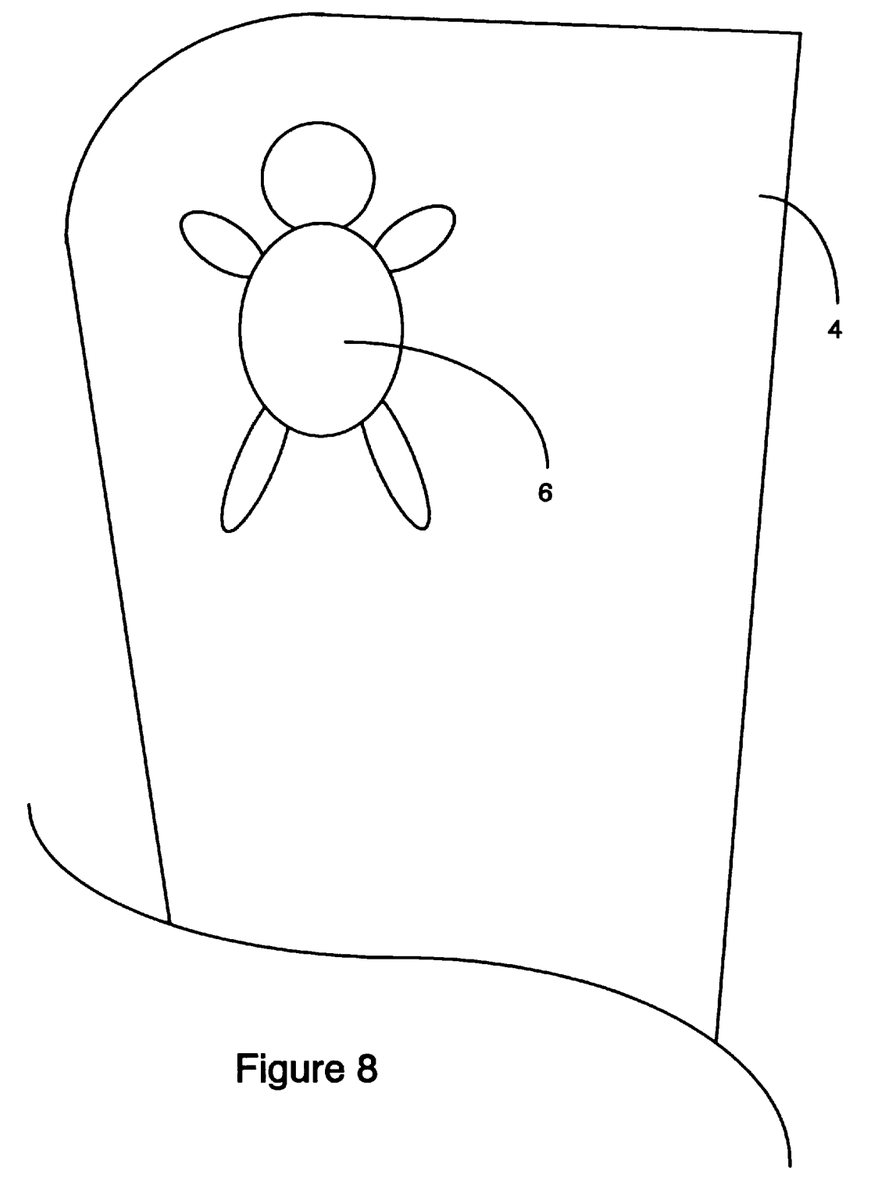
FIG. 8 is a side view of a portion of the side panel illustrating a preferred embodiment of the invention in which the illumination device has been cut in the shape of an entertaining character.

FIG. 8 shows another alternative embodiment in which the EL lamp 6 has been cut in the shape of an entertaining character. The EL lamp 6 is shown mounted on the side panel 4 of car seat 1. An advantage associated with electro-luminescent lamps is that they can be cut into any desired shape. As a result, a variety of characters, silhouettes, alphabet letters, etc. can be used to entertain the child or infant. Of course, other illumination technologies may also be configured to provide characters etc. However, they may require additional components such as masked covers.

Figure 9:
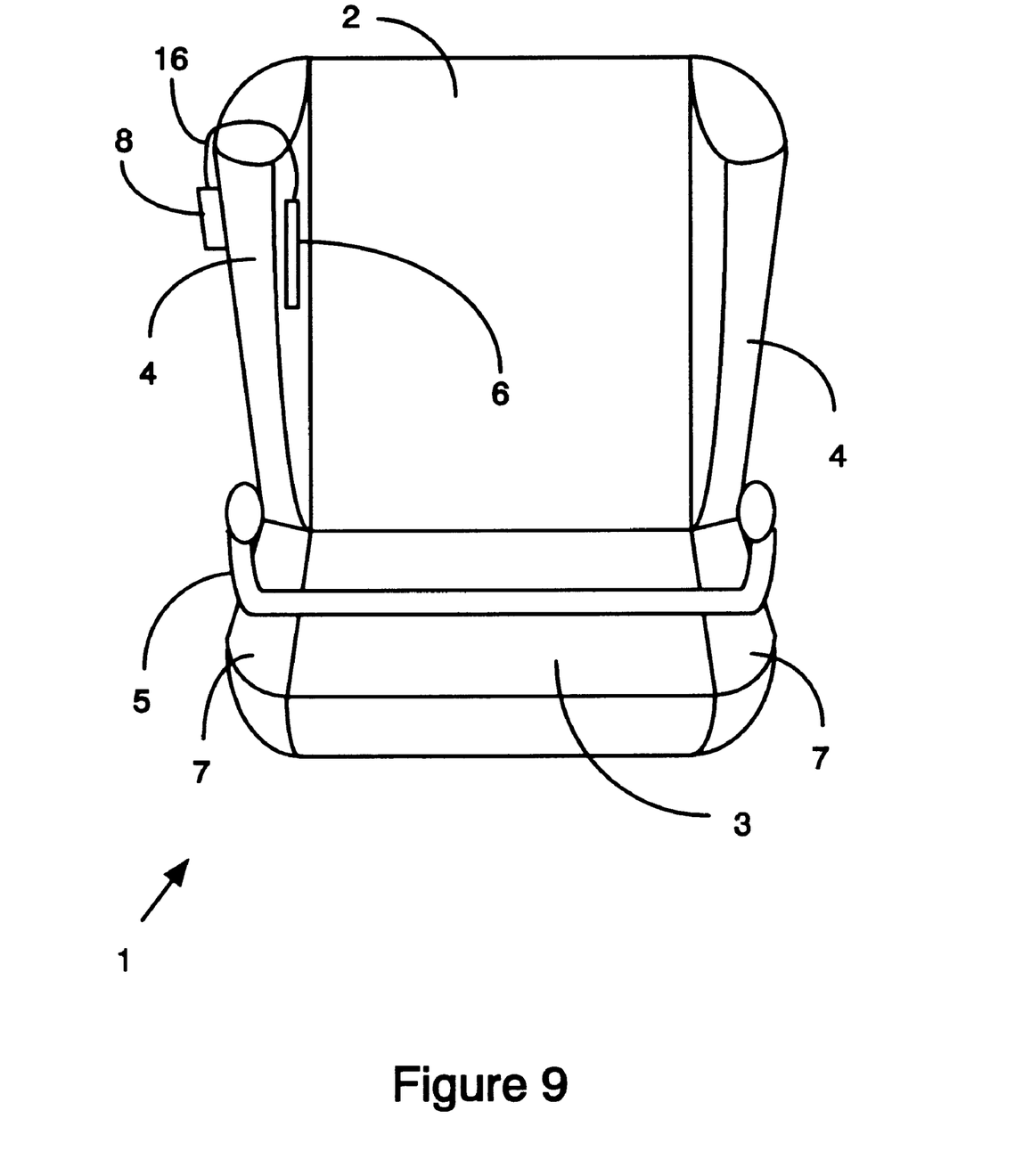
FIG. 9 is a top front prospective view of an alternative preferred embodiment which uses a detachable lamp assembly.

FIG. 9 illustrates another alternative embodiment in which the EL lamp 6 and the electronic controls 8 are detachably mounted to the car seat 1. The electronic controls 8 are electrically connected to the EL lamp 6 via electrical wiring 16. In the preferred embodiment, the EL lamp 6 and the electronic controls 8 are attached to the car seat 1 via hook and loop material. Hook and loop material is well-known in the art. The advantage of detachably mounting the electronic controls 8 and the EL lamp 6 to car seat 1 is that it allows them to be moved from one car seat 1 to another. For illustrative purposes, the electronic controls 8 and the EL lamp 6 are shown as separate devices connected by wiring 16. However, in practice, the electronic controls 8 and the EL lamp 6 would be fabricated as a single device and no wiring 16 would be required.

While the invention has been described with respect to a preferred embodiment thereof, it will be understood by those skilled in the art that various changes in detail may be made therein without departing from the spirit, scope, and teaching of the invention. For example, the type of lamp technology can be anything suitable for its use herein, the size and shape of the lamp can vary, the colors may vary, the remote controller can be permanently mounted or portable. The type of material used, if any, can vary, and may be transparent to allow placement of the lamp inside structure of the car seat 1. Accordingly, the invention herein disclosed is to be limited only as specified in the following claims.

We claim:

1. A car seat with an integrated lamp assembly, further comprising:

a seat back;

a seat bottom;

at least one integrated lamp, positioned such that, when activated, an occupant of the car seat will be at least partially illuminated; and means to control activation of the integrated lamp, further comprising:

electronic controls, further comprising:

means to receive commands for controlling the integrated lamp; and means to control operation of the integrated lamp; and a remote control having means to transmit control signals to the electronic controls for controlling the integrated lamp;

whereby the occupant of the car seat can be illuminated by activating the integrated lamp, and the integrated lamp can be controlled from a remote location.

2. A car seat, as claim 1, wherein the integrated lamp is an electro-luminescent lamp.

3. A car seat, as claim 2, wherein the integrated lamp is shaped in the form of entertaining images.

4. A car seat, as claim 1, wherein the integrated lamp is an LED lamp.

5. A car seat, as claim 1, further comprising a plurality of integrated lamps.

6. A car seat, as claim 1, wherein the integrated lamp is detachably attached to the car seat;

whereby the integrated lamp can be moved from one car seat to another.

7. A car seat, as claim 1, wherein:

the remote control further comprise a dimmer control, the dimmer control capable of varying the control signals to indicate variations in the desired intensity of light generated by the integrated lamp; and the electronic controls further comprise means to control the intensity of light generated by the integrated lamp based on the content of the control signals.

8. A car seat with an integrated lamp assembly, further comprising:

a seat back;

a seat bottom;

at least portion of the car seat is fabricated from transparent material;

at least one integrated lamp, positioned such that, when activated, the occupant of car seat will be at least partially illuminated;

the integrated lamp is mounted in the transparent material such that, when illuminated, the integrated lamp illuminates the occupant of the car seat; and means to control activation of the integrated lamp, further comprising:

electronic controls, further comprising:

means to receive commands for controlling the integrated lamp; and means to control operation of the integrated lamp; and a remote control having means to transmit control signals to the electronic controls for controlling the integrated lamp;

whereby the occupant car seat can be illuminated by activating the integrated lamp, and the integrated lamp can be controlled from a remote location.

9. A car seat, as claim 8, wherein the integrated lamp is an electro-luminescent lamp.

10. A car seat, as claim 9, wherein the integrated lamp is shaped in the form of entertaining images.

11. A car seat, as claim 10, further comprising a plurality of integrated lamps.

12. A car seat, as claim 11, further comprising:

a restraining bar; and the integrated lamp is integrated into the restraining bar.

13. A method of illuminating the occupant of a car seat with an integrated lamp assembly, including the steps of:

integrating an integrated lamp into the car seat, such that, when activated, the occupant of car seat will be at least partially illuminated; and controlling activation of the integrated lamp, including the additional steps of:

using electronic controls to receive commands for controlling the integrated lamp and further using the electronic controls to control operation of the integrated lamp; and using a remote control having means to transmit control signals to the electronic controls to control operation of the integrated lamp;

whereby the occupant car seat can be illuminated by remotely activating the integrated lamp.

14. A method, as in claim 13, including the additional step of using an electro-luminescent lamp as the integrated lamp.

15. A method, as in claim 14, including the additional step of shaping the integrated lamp in the form of entertaining images.

16. A method, as in claim 15, including the additional steps of:

fabricating at least portion of the car seat from transparent material; and mounting the integrated lamp in the car seat and under the transparent material such that, when illuminated, the integrated lamp illuminates the occupant of the car seat.

17. A method, as in claim 16, including the additional step of using an electro-luminescent lamp as the integrated lamp.

18. A method, as in claim 15, including the additional step of removably attaching the integrated lamp to the car seat;

whereby the integrated lamp can be moved from one car seat to another.

* * * * *